(12) United States Patent
Sakurai (10) Patent No.: US 8,837,030 B2
(45) Date of Patent: Sep. 16, 2014

(54) BLADE DRIVE DEVICE AND OPTICAL EQUIPMENT

(75) Inventor: Motoharu Sakurai, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/616,366

(22) Filed: Sep. 14, 2012

(65) Prior Publication Data

US 2013/0003156 A1 Jan. 3, 2013

Related U.S. Application Data

(63) Continuation of application No. PCT/JP2011/070999, filed on Sep. 14, 2011.

(30) Foreign Application Priority Data

Dec. 22, 2010 (JP) .................................. 2010-286668

(51) Int. Cl.
*G02B 26/02* (2006.01)
*G03B 9/04* (2006.01)
*G03B 35/04* (2006.01)
*G03B 9/26* (2006.01)

(52) U.S. Cl.
CPC *G03B 9/04* (2013.01); *G03B 35/04* (2013.01); *G03B 9/26* (2013.01)
USPC ......................................................... 359/234

(58) Field of Classification Search
CPC .... G02B 5/005; G02B 26/04; G02B 21/0044; G03B 7/085; G03B 7/10; G03B 7/097
USPC .......... 359/227, 233–236; 396/235, 246, 355, 396/357, 449, 452–453, 461, 483–490, 493, 396/498
See application file for complete search history.

(56) References Cited

U.S. PATENT DOCUMENTS

2010/0181463 A1* 7/2010 Ide .................................. 250/205
2011/0085223 A1* 4/2011 Ide et al. ........................ 359/233

FOREIGN PATENT DOCUMENTS

| JP | H1-154134 | 6/1989 |
| JP | H10-319310 | 12/1998 |
| JP | 2006-162990 A1 | 6/2006 |
| JP | 2008-242185 A1 | 10/2008 |

OTHER PUBLICATIONS

International Search Report for International Application No. PCT/JP2011/070999 dated Oct. 11, 2011.

* cited by examiner

*Primary Examiner* — Jennifer L. Doak
(74) *Attorney, Agent, or Firm* — Kratz, Quintos & Hanson, LLP (57) ABSTRACT

A blade drive device includes: a board including an opening; a first blade movable toward and away from the opening, and including: a first slot; and first and second aperture openings each of which is smaller than the opening; a second blade movable toward and away from the opening and including a second slot; a first drive member including a first drive pin that engages the first slot and that is rotatable about a predetermined position; and a second drive member including a second drive pin that engages the second slot and that is rotatable about a predetermined position.

5 Claims, 6 Drawing Sheets

BLADE DRIVE DEVICE AND OPTICAL EQUIPMENT

CROSS-REFERENCE TO RELATED APPLICATION

This application is a continuation of and claims priority to International Patent Application No. PCT/JP2011/070999 filed on Sep. 14, 2011, which claims priority to Japanese Patent Application No. 2010-286668 filed on Dec. 22, 2010, subject matter of these patent documents is incorporated by reference herein in its entirety.

BACKGROUND (i) Technical Field

The present invention relates to blade drive devices and optical equipment.

(ii) Related Art

Japanese Patent Application Publication No. 2006-162990 discloses a camera for taking three-dimensional images. This camera is individually provided with a lens and an image pickup element for taking an image for a right eye, and is provided with a lens and an image pickup element for taking an image for a left eye.

However, a blade drive device for taking three-dimensional images is not disclosed.

SUMMARY

It is thus an object of the present invention to provide a blade drive device for taking a three-dimensional image and optical equipment having the same.

According to an aspect of the present invention, there is provided a blade drive device including: a board including an opening; a first blade movable toward and away from the opening, and including: a first slot; and first and second aperture openings each of which is smaller than the opening; a second blade movable toward and away from the opening and including a second slot; a first drive member including a first drive pin that engages the first slot and that is rotatable about a predetermined position; and a second drive member including a second drive pin that engages the second slot and that is rotatable about a predetermined position, wherein when the second drive pin rotates in one direction in a closed state where both of the first and second aperture openings overlap the opening, the second blade reciprocates between a position where the second blade covers only the first aperture opening and a position where the second blade covers only the second aperture opening.

DETAILED DESCRIPTION

Figure 1:
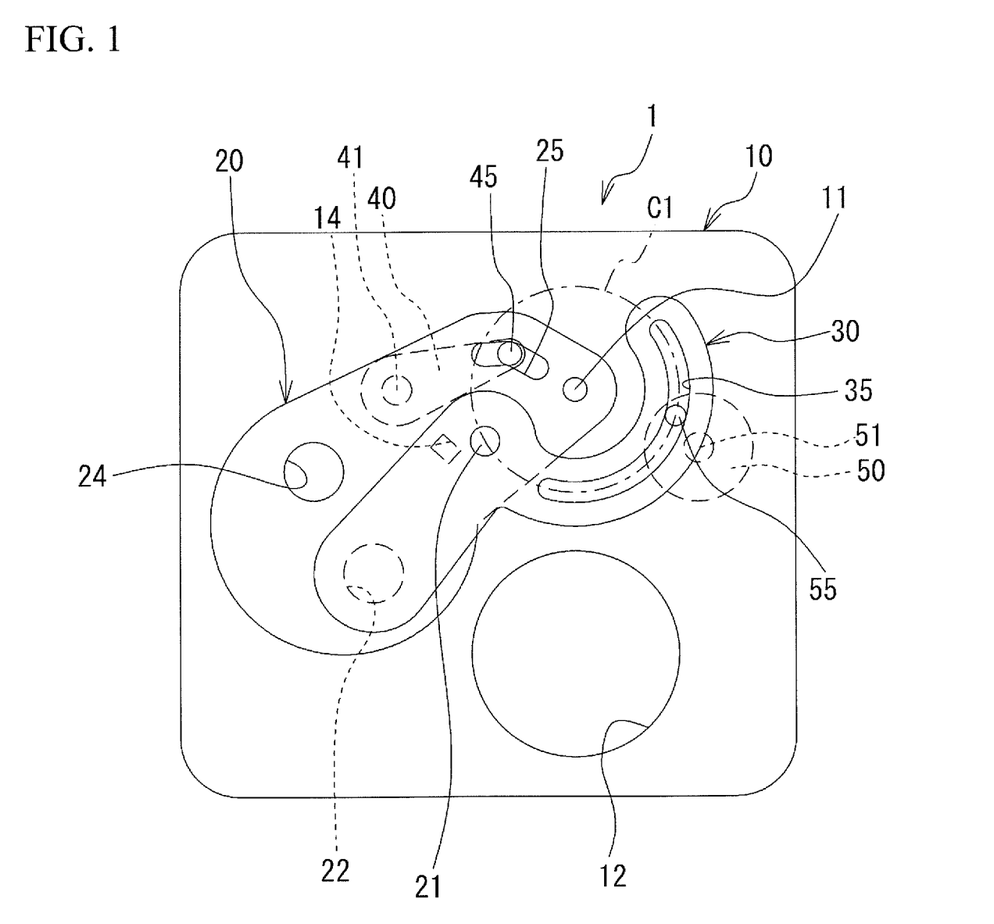
FIG. 1 is an explanatory view of a blade drive device according to the present embodiment.
Figure 2:
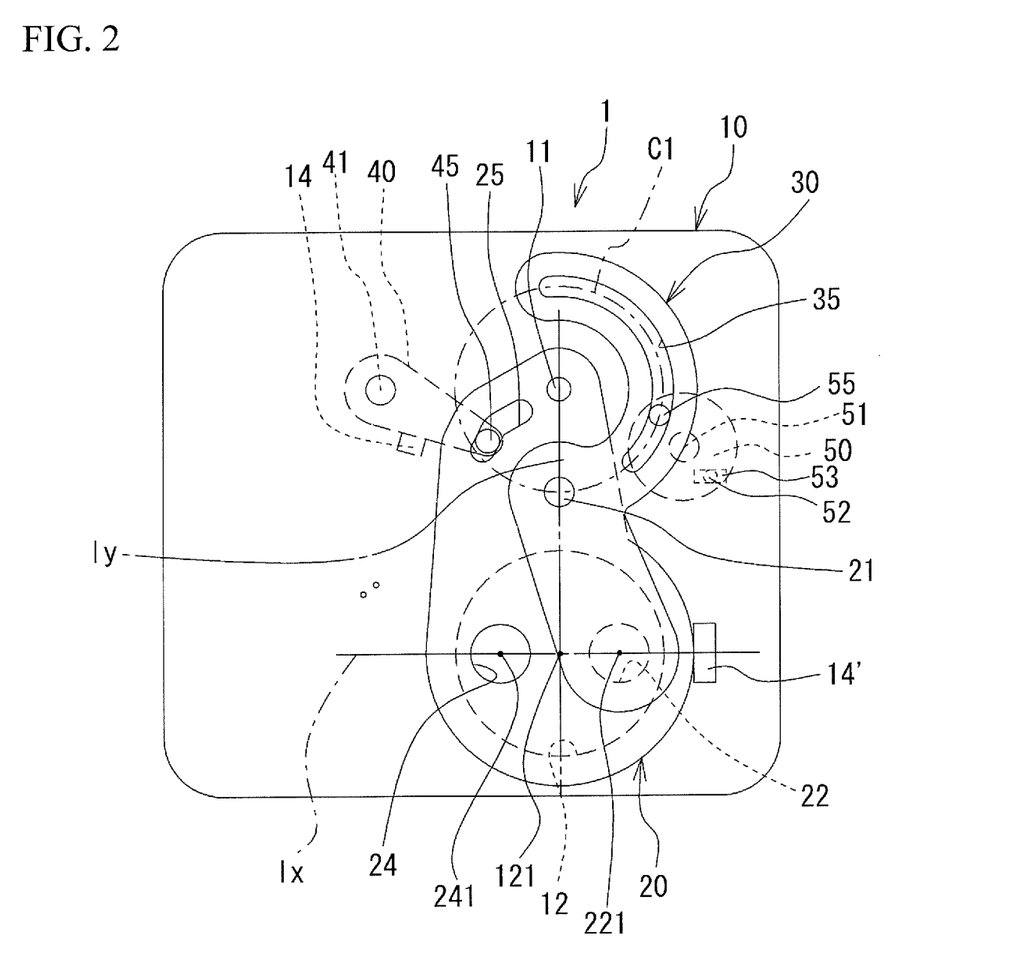
FIG. 2 is an explanatory view of the blade drive device according to the present embodiment.
Figure 3:
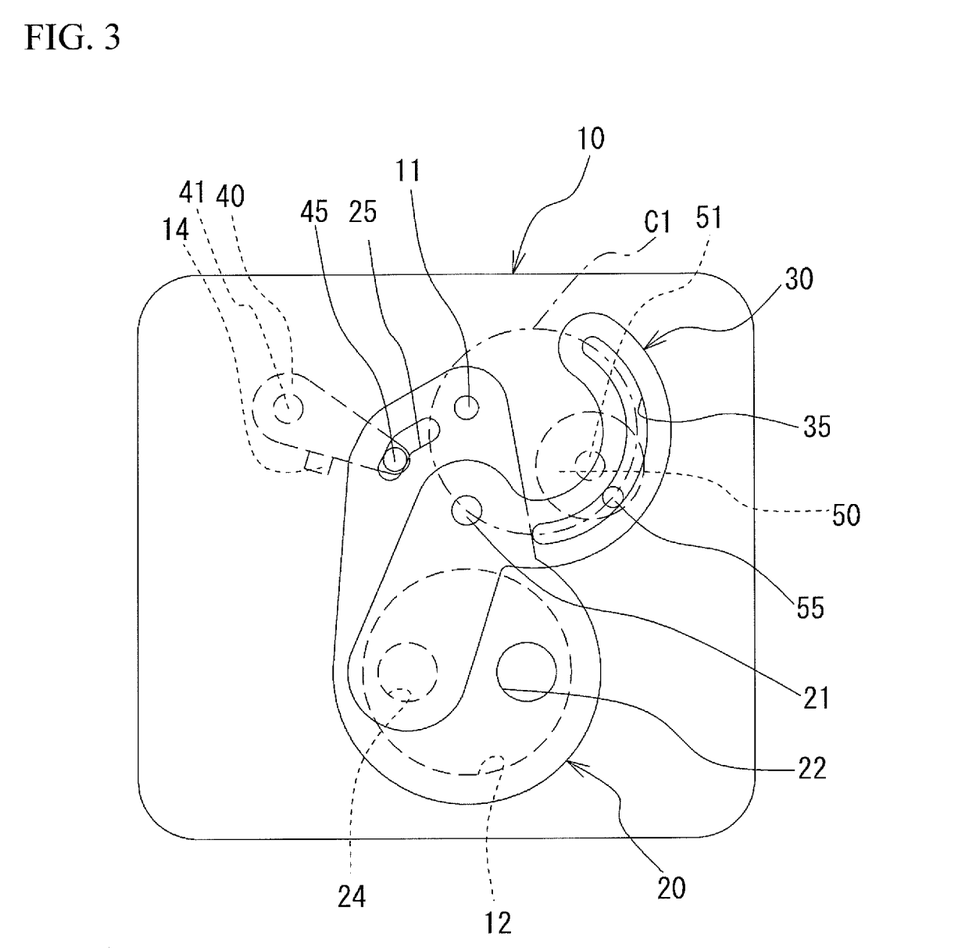
FIG. 3 is an explanatory view of the blade drive device according to the present embodiment.

FIGS. 1 to 3 are explanatory views of a blade drive device 1 according to the present embodiment. The blade drive device 1 is a blade drive device employed in an optical equipment such as a camera. The blade drive device 1 includes: a board 10; a first blade 20; a second blade 30; a first drive member 40; and a second drive member 50. The board 10 is formed with an opening 12. Light passes through the opening 12 from the subject side, and then enters an image pickup element such as a CCD or a CMOS sensor installed in the camera. Thus, an image is formed on the image pickup element. FIG. 1 illustrates a receded state where the first blade 20 and the second blade 30 recede from the opening 12. Thus, the opening 12 is in a fully opened state in FIG. 1. FIGS. 2 and 3 illustrate a closed state where the first blade 20 and the second blade 30 close the opening 12. The first blade 20 and the second blade 30 are arranged at one surface side of the board 10. The first drive member 40 and the second drive member 50 are arranged at the other surface side of the board 10. The first drive member 40 and the second drive member 50 are respectively rotated by actuators, not illustrated.

Additionally, in FIGS. 1 to 4, the opening 12, a spindle 11, a spindle 41 of the first drive member 40, a spindle 51 of the second drive member 50, and a stopper 14 are positionally displaced with respect to a rectangular shape of the board 10 every drawing. However, these positional relationships are fixed.

The first blade 20 is formed with two openings of a first aperture opening 22 and a second aperture opening 24. The first aperture opening 22 and the second aperture opening 24 have the same size. Each size of the first aperture opening 22 and the second aperture opening 24 is smaller than that of the opening 12. The first blade 20 is rotatably supported by the spindle 11 of the board 10. Additionally, the spindle 11 may not be formed in the board 10 in which the opening 12 is formed, and the spindle 11 has only to be provided at a fixed position with respect to the opening 12. The second blade 30 is rotatably connected with the first blade 20 by a connection member 21 as will be described later. A stopper 14 is provided on the board 10. The stopper 14 is provided on the board 10 at the side where the first drive member 40 is provided.

Additionally, the embodiment has described an example that the stopper 14 restricts the first drive member 40 from rotating to position the first blade 20. However, as illustrated in FIG. 2, a stopper 14' may be further provided for abutting with and positioning the first blade 20. The stoppers 14 and 14' function to restrict the first blade 20 from rotating toward the closed state where the first blade 20 closes the opening 12 from the receded state where the first blade 20 recedes from the opening 12. Also, only the stopper 14' abutting with the first blade 20 may restrict the first blade 20 from rotating to the closed state.

The first blade 20 and the second blade 30 are formed with a first slot 25 and a second slot 35, respectively. The first drive member 40 and the second drive member 50 include a first drive pin 45 and a second drive pin 55, respectively. The first drive pin 45 and the second drive pin 55 respectively engage the first slot 25 and the second slot 35. The first drive member 40 has a lever shape, and the second drive member 50 has a round plate shape. However, these shapes are not limited. Both of the first drive pin 45 and the second drive pin 55 rotate about predetermined positions of the board 10, that is, the spindles 41 and 51, respectively. The board 10 is formed with slots, not illustrated, for escaping the movements of the first drive pin 45 and the second drive pin 55. The first slot 25 includes two linear portions. The second slot 35 has an arc shape.

The first drive member 40 and the second drive member 50 are driven by actuators (not illustrated) that are individually provided, respectively. Specifically, this actuator includes: a rotor magnetized to have different polarities in a circumferential direction; a stator, the magnetic attractive force and the magnetic repulsive force being generated between the stator and the rotor; and a coil for exciting the stator. For example, the rotors are connected with the first drive member 40 and the second drive member 50 through rotational shafts of the rotors. Therefore, the rotational movements of the rotors are transmitted to the first drive member 40 and the second drive member 50.

In the state illustrated in FIG. 1, the second blade 30 closes the first aperture opening 22 of the first blade 20. The first drive member 40 rotates clockwise from the state illustrated in FIG. 1 until abutting with the stopper 14, and then the first blade 20 and the second blade 30 close the opening 12 as illustrated in FIG. 2. In this case, since the second blade 30 is connected with the first blade 20 through the connection member 21, the second blade 30 moves with the first blade 20 to such a position to close the opening 12.

Also, at this time, the second drive member 50 is in a stopped state. Herein, as illustrated in FIGS. 1 and 2, a center of the arc shape of the second slot 35 is substantially identical to the spindle 11 serving as the rotational center of the first blade 20. Also, in this state, the rotor connected with the second drive member 50 stops in the non-energized state. That is, the position of the rotor stopping in the non-energized state is set within the second slot 35 in the state where the center of the arc shape of the second slot 35 is identical to the rotational center of the first blade. Thus, by driving the first drive member 40, the second blade 30 can rotate about the spindle 11 as a fulcrum while the constant relative positional relationship between the first blade 20 and the second blade 30 is maintained.

Additionally, the actuator for driving the second drive member 50 is a step motor capable of stopping a rotor in the non-energized state. Specifically, the rotor stops at a predetermined position in the non-energized state by a detent torque which is generated by the magnetic force exerted between the stator and plural different polarities magnetized in the circumferential direction of the rotor. Therefore, even when only the first drive member 40 moves from the receded state as illustrated in FIG. 1 and then the first blade 20 and the second blade 30 are moved, the second drive member 50 does not drive. Thus, the second blade 30 rotates counterclockwise with the first blade 20, and then the second drive pin 55 relatively moves within the second slot 35. Additionally, as illustrated in FIGS. 1 and 2, the second blade 30 recedes from the second aperture opening 24 of the first blade 20 and closes the first aperture opening 22. The second blade 30 can shift to the closed state from the receded state while this state is maintained.

As illustrated in FIG. 2, in the closed state, both of the first aperture opening 22 and the second aperture opening 24 wholly overlap the opening 12. Further, a center 221 of the first aperture opening 22 and a center 241 of the second aperture opening 24 are arranged on a line lx passing through a center 121 of the opening 12, and are symmetrical with respect to the center 121. Herein, the spindle 11 and the connection member 21 are arranged on a line ly which passes through the center 121 and which is perpendicular to the line lx. In other words, each size of the opening 12, the first aperture opening 22, and the second aperture opening 24, and the positional relationship between the first aperture opening 22 and the second aperture opening 24 are designed to satisfy such above conditions.

Next, the operation of the second blade 30 will be described later. As illustrated in FIG. 3, the second drive member 50 rotates counterclockwise or clockwise, and then the second drive pin 55 moves within the second slot 35. Therefore, the second blade 30 reciprocates about the connection member 21 within a predetermined range. In other words, the second blade 30 swings about the connection member 21 in a predetermined angle range. Therefore, as illustrated in FIGS. 2 and 3, the second blade 30 reciprocates between the first aperture opening 22 and the second aperture opening 24 so as to alternately close the first aperture opening 22 and the second aperture opening 24. Therefore, the light entering the image pickup element through the first aperture opening 22 or the second aperture opening 24 can be shifted alternately. Thus, two kinds of images based on different viewpoints can be formed alternately. Based on these two kinds of images, a three-dimensional image can be formed.

The rotation of the second drive member 50 in one direction causes the second blade 30 to reciprocate within a predetermined range. Therefore, for example, the second blade 30 can be reciprocated at a high speed, as compared with a case where the second blade 30 is reciprocated by the alternate changing of the rotational direction of the second drive member 50. It is thus possible to alternately take the different images viewed from two different viewpoints at a high frame rate.

Also, in a case where the second blade 30 is reciprocated, the abutment of the second blade 30 with a stopper for positioning the second blade 30 generates operating noise. However, in the present embodiment, the second drive member 50 is rotated in one direction, and the second blade 30 can be positioned without providing a stopper for positioning the second blade 30. With these arrangements, the first aperture opening 22 and the second aperture opening 24 are closed alternately without generating the operating noise of the second blade 30. It is thus possible to alternately take the different images viewed respectively from two different viewpoints at a high frame rate with reduced operating noise.

Herein, it is conceivable that the second blade 30 is driven without connecting the second blade 30 with the first blade 20. In this case, the second blade 30 has to be moved among a receded position where the second blade 30 recedes from the opening 12, a first closed position where the second blade 30 closes the first aperture opening 22 with the first blade 20 closing the opening 12, and a second closed position where the second blade 30 closes the second aperture opening 24 with the first blade 20 closing the opening 12. In this case, when the second drive member 50 is rotated only in one direction to move the second blade 30 to these three positions, the second blade 30 is required to be moved into the receded position, the first closed position, and the second closed position alternatively in this order. Thus, after the second blade 30 temporarily moves to the receded position, the second blade 30 moves to the first and the second closed positions again. For this reason, the movable distance of the second blade 30 is increased, and is unsuitable for an increase in the speed thereof. Also, since the second blade 30 always passes through the receded position, the images respectively based on two different viewpoints cannot be obtained at a high frame rate. Moreover, in this case, when the second blade 30 is temporarily positioned at the receded position, both of the first aperture opening 22 and the second aperture opening 24 are opened. Thus, this might adversely influence the images.

In the present embodiment, as mentioned above, the first blade 20 and the second blade 30 are connected with each other. The driving of the first drive member 40 shifts the second blade 30 and the first blade 20 from the receded state where they recede from the opening 12 to the closed state where they close the opening 12. Thus, the driving of the second drive member 50 causes the second blade 30 to reciprocate between the position where the second blade 30 closes the first aperture opening 22 and the position where the second blade 30 closes the second aperture opening 24. It is therefore possible to alternately take different images viewed respectively from two viewpoints at a high frame rate.

For example, the blade drive device 1 according to the present embodiment is arranged close to the object side, as compared with a single lens provided at the camera side. The first aperture opening 22 and the second aperture opening 24 are closed alternately, so that light alternately enters the different positions of the lens. Thus, for example, unlike the camera disclosed in the above mentioned Japanese Patent Application Publication No. 2006-162990, it is not necessary to individually provide a lens and an image pickup element for obtaining an image for a right eye, and a lens and an image pickup element for obtaining an image for a left eye. Accordingly, the blade drive device according to the present invention can be employed in a general camera equipped with a lens and a single image pickup element. Thus, the general camera can also take three-dimensional images.

Figure 4:
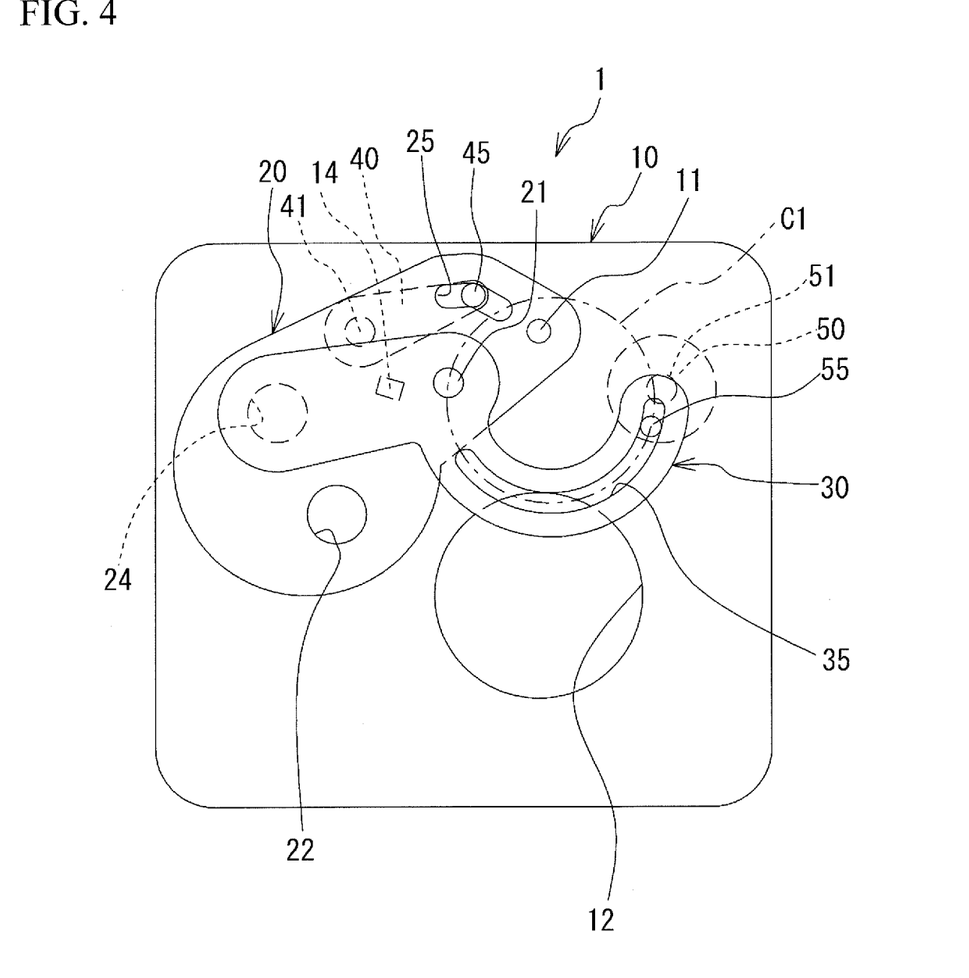
FIG. 4 is a view where a first drive member is driven in the state where a second drive member stops and a second blade closes a second aperture opening.

Additionally, in order to be returned to the receded state from the state as illustrated in FIG. 3, the second drive member 50 has to stop in the state where the second blade 30 closes the first aperture opening 22 (the state as illustrated in FIG. 2), and then the first drive member 40 has to be driven to shift the state to the receded state. FIG. 4 is a view of a case where the first drive member 40 is driven in the state where the second drive member 50 stops with the second blade 30 closing the second aperture opening 24. As illustrated in FIG. 3, in the state where the second blade 30 closes the second aperture opening 24, the center position of the phantom circle C1 along the second slot 35 is positionally displaced with the spindle 11 serving as the rotational center of the first blade 20. Thus, the first drive member 40 drives in this state, so that the second blade 30 rotates and the second drive member 50 is rotated as illustrated in FIG. 4.

In the present embodiment, the step motor capable of stopping the rotor in the non-energized state is employed as the drive source of the second drive member 50. Thus, it is conceivable that the holding force of the drive source of the second drive member 50 acts as the resistance of the driving of the first drive member 40. Also, as illustrated in FIG. 4, a part of the second blade 30 overlaps the opening 12. This might influence the images in the state where the opening 12 is fully opened. Thus, in the blade drive device 1 according to the present invention, after the second drive member 50 stops in the state where the second blade 30 closes the first aperture opening 22, the first drive member 40 drives to return the state to the receded state.

For example, a sensor may be provided for detecting that the second drive pin 55 of the second drive member 50 stops at positions illustrated in FIGS. 1 and 2, and it may be determined whether or not the second drive member 50 drives by a control circuit of the camera based on output signals from this sensor. For example, the sensor is a magnetic sensor or the like for detecting the stop position of the rotor of the actuator driving the second drive member 50. For example, the magnetic sensor is a hall sensor.

The sensor is not limited to this. For example, as illustrated in FIG. 2, a reflector plate 52 may be provided at a predetermined position in the second drive member 50, and a photo reflector 53 may be provided at a position facing the reflector plate 52, thereby detecting the position of the second drive member 50. Also, a through hole may be provided instead of the reflector plate 52, and a photo interrupter which includes a light emitting portion and a light receiving portion facing each other through the through hole may be provided in stead of the photo reflector.

Figure 5A:
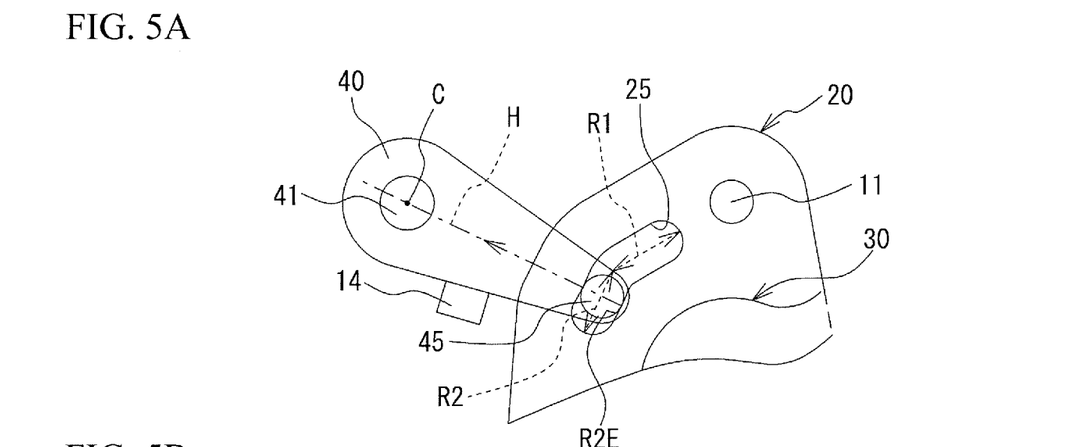
FIGS. 5A to 5C are explanatory views of lock of a first blade.
Figure 5B:
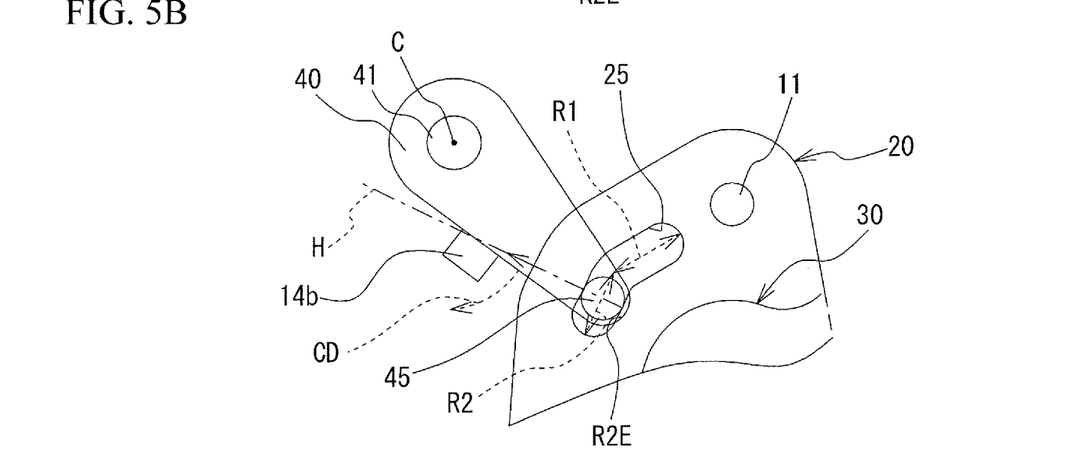
Figure 5C:
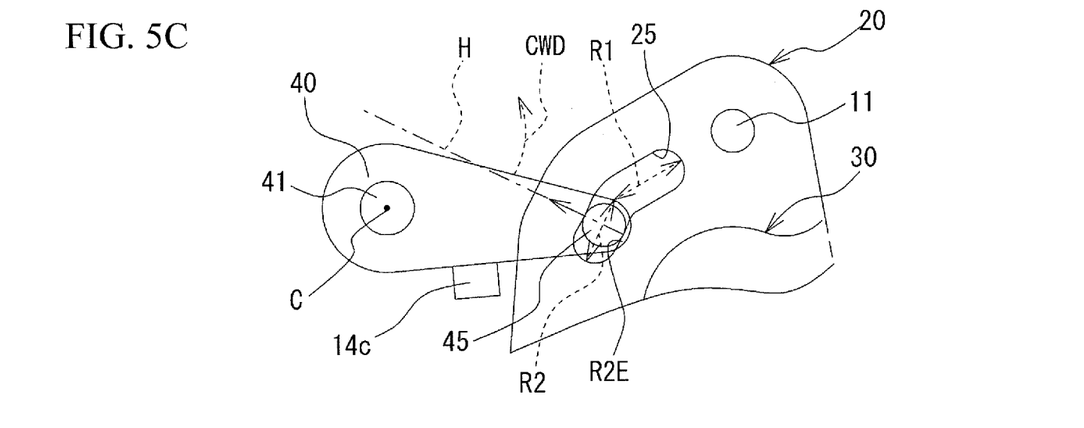

Next, the lock of the first blade 20 will be described. FIGS. 5A to 5C are explanatory views of the lock of the first blade 20. Additionally, in FIGS. 5A to 5C, solid lines are entirely used to facilitate understanding the configuration. FIG. 5A is an enlarged view around the first drive pin 45 in the state where the first blade 20 is positioned in the closed state. In the state where the first blade 20 is positioned in the closed state to close the opening 12, a perpendicular line H, which is perpendicular to an edge R2E of the first slot 25 with which the first drive pin 45 abuts, passes through the rotational center C of the first drive member 40.

When clockwise force about the spindle 11 is exerted on the first blade 20 for some reason, the first drive pin 45 receives force in the direction of the perpendicular line H. However, since the perpendicular line H passes through the rotational center C of the first drive member 40, the first drive member 40 does not rotate. Thus, the first blade 20 is locked in the closed state. This prevents the first blade 20 from being unexpectedly displaced from the closed state.

FIG. 5B is an explanatory view of a state where the first blade 20 is locked with the rotational center C of the first drive member 40 positioned opposite to a stopper 14b across the perpendicular line H. In this case, the perpendicular line H does not pass through the rotational center C of the drive member 40. The perpendicular line H extends in such a direction as to cause the first drive member 40 to rotate in the clockwise direction CD, that is, the perpendicular line H extends in such a direction as to cause the first blade 20 to rotate from the receded state to the closed state. When force is exerted on the first blade 20 in the clockwise direction, the force is exerted on the first drive member 40 in the direction of the perpendicular line H. Thus, the first drive member 40 tries to rotate in the clockwise direction CD. However, since the stopper 14b is provided, the first drive member 40 is suppressed from rotating clockwise. Likewise, in the case a stopper 14b' is provided for abutting with the first blade 20, even when force is exerted on the first drive member 40 in the direction of the perpendicular line H and the first drive member 40 tries to rotate clockwise, the first blade 20 is prevented from rotating to the closed state side. For this reason, the first blade 20 is locked in the closed state, thereby preventing the first blade 20 from being unexpectedly displaced from the closed state.

FIG. 5C is an explanatory view of a state where the first blade 20 is not locked with the rotational center C of the first drive member 40 and a stopper 14c positioned at the same side with respect to the perpendicular line H. In this case, when clockwise force is exerted on the first blade 20, the perpendicular line H extends in such a direction as to cause the first drive member 40 to rotate in the counterclockwise direction CWD, that is, the perpendicular line H extends in such a direction as to cause the first blade 20 to rotate from the closed state to the receded state. For this reason, the force is exerted on the first drive member 40 so as to move away from the stopper 14c. Thus, in this case, the first blade 20 might be displaced from the closed state. Accordingly, this case cannot lock the first blade 20.

Additionally, the first slot 25 includes two linear regions R1 and R2. The directions to which the regions R1 and R2 extend are different from each other. In the receded state illustrated in FIG. 1, the first drive pin 45 is positioned in the vicinity of the boundary between the regions R1 and R2. When the first drive member 40 starts rotating clockwise from the receded state illustrated in FIG. 1, the first drive pin 45 starts moving toward an end portion of the region R1 from the boundary between the regions R1 and R2. When the first drive member 40 further rotates clockwise, the first drive pin 45 moves from the region R1 toward the region R2 before the first blade 20 moves to the closed state illustrated in FIG. 2. When the first blade 20 is positioned in the closed state, the first drive pin 45 recedes from the region R1 and is positioned within the region R2. In the above way, the region R1 mainly functions to move the first blade 20 between the receded state and the closed state, and the region R2 mainly functions to lock the first blade 20 in the closed state. Additionally, the present embodiment has described an example of the first slot 25 which includes two linear portions. However, the first slot 25 may have an arc shape, a cam curve, or a shape combining them.

Figure 6:
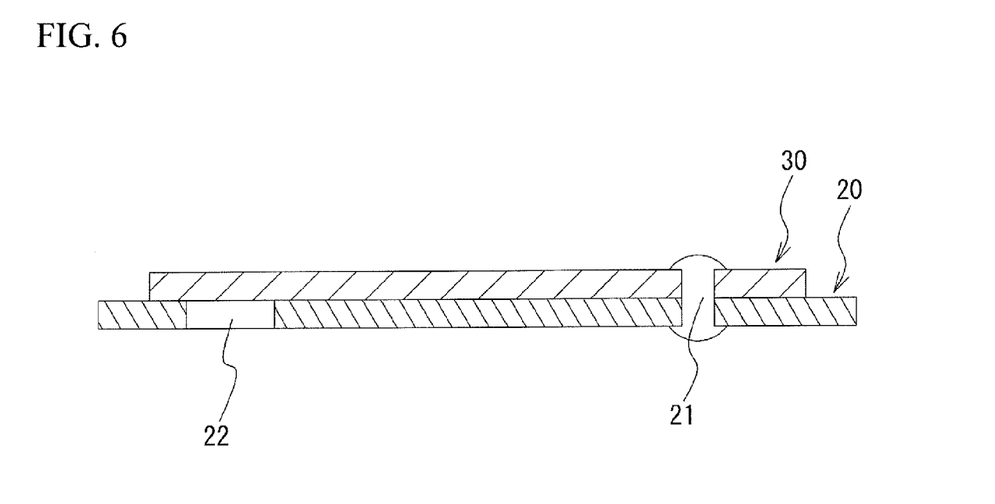
FIG. 6 is a sectional view of the first blade and the second blade.

Next, a structure of the connection member 21 will be simply described. FIG. 6 is a sectional view of the first blade 20 and the second blade 30. The connection member 21 is a pin-shaped member which has an upper end and a lower end, and the upper or lower end is treated by caulking. Therefore, the first blade 20 and the second blade 30 are connected with each other. Additionally, a part for connecting the first blade 20 with the second blade 30 for rotation is not limited to this.

While the exemplary embodiments of the present invention have been illustrated in detail, the present invention is not limited to the above-mentioned embodiments, and other embodiments, variations and modifications may be made without departing from the scope of the present invention.

Finally, several aspects of the present invention are summarized as follows.

According to an aspect of the present invention, there is provided a blade drive device including: a board including an opening; a first blade movable toward and away from the opening, and including: a first slot; and first and second aperture openings each of which is smaller than the opening; a second blade movable toward and away from the opening and including a second slot; a first drive member including a first drive pin that engages the first slot and that is rotatable about a predetermined position; and a second drive member including a second drive pin that engages the second slot and that is rotatable about a predetermined position, wherein when the second drive pin rotates in one direction in a closed state where both of the first and second aperture openings overlap the opening, the second blade reciprocates between a position where the second blade covers only the first aperture opening and a position where the second blade covers only the second aperture opening.

The reciprocating movement of the second blade is achieved by rotating the second drive pin in one direction. This can improve the speed of the reciprocating movement of the second blade and can suppress the noise caused by the reciprocating movement of the second blade. It is thus possible to provide the blade drive device suitable for taking three-dimensional images.

According to another aspect of the present invention, there is provided an optical equipment including the above blade drive device.

What is claimed is:

1. A blade drive device comprising:
   a board including an opening;
   a first blade movable toward and away from the opening, and including: a first slot and first and second aperture openings each of which is smaller than the opening;
   a second blade movable toward and away from the opening and including a second slot;
   a pin-shaped connection member rotatably and directly connecting the second blade with the first blade;
   a first drive member including a first drive pin that engages the first slot and that is rotatable about a predetermined position; and
   a second drive member including a second drive pin that engages the second slot and that is rotatable about a predetermined position,
   wherein when the second drive pin rotates in one direction in a closed state where both of the first and second aperture openings overlap the opening, the second blade reciprocates between a position where the second blade covers only the first aperture opening and a position where the second blade covers only the second aperture opening.

2. The blade drive device of claim 1, wherein the second blade is rotatably connected with the first blade, and
   the second blade moves toward and away from the opening together with the first blade by rotating the first drive pin.

3. The blade drive device of claim 1, further comprising a stopper restricting the first drive member, in the closed state, from rotating in such a direction to make the closed state,
   wherein, in the closed state, a rotational center of the first drive member is positioned on a perpendicular line to an inner edge of the first slot with which the first drive pin abuts, or, in the closed state, a direction of the perpendicular line is a direction such that the first drive member causes the first blade to rotate toward the closed state from a receded state where the first blade recedes from the opening.

4. The blade drive device of claim 1, further comprising an actuator for driving the second drive member,
   wherein the actuator includes a rotor that is capable of stopping at a predetermined position in a non-energized state and that is connected with the second drive member,
   the second slot has an arc shape about a predetermined position serving as a center,
   when a rotational center of the first blade is identical to the center of the arc shape and the rotor stops in the non-energized state, the second drive pin is positioned within the second slot, after this state, the first blade and the second blade are receded from the opening.

5. An optical equipment comprising a blade drive device including:
   a board including an opening;
   a first blade movable toward and away from the opening, and including: a first slot and first and second aperture openings each of which is smaller than the opening;
   a second blade movable toward and away from the opening and including a second slot;
   a pin-shaped connection member rotatably and directly connecting the second blade with the first blade;
   a first drive member including a first drive pin that engages the first slot and that is rotatable about a predetermined position; and
   a second drive member including a second drive pin that engages the second slot and that is rotatable about a predetermined position, wherein when the second drive pin rotates in one direction in a closed state where both of the first and second aperture openings overlap the opening, the second blade reciprocates between a position where the second blade covers only the first aperture opening and a position where the second blade covers only the second aperture opening.

\* \* \* \* \*